United States Patent [19]

Shiomi et al.

[11] Patent Number: 4,977,446
[45] Date of Patent: Dec. 11, 1990

[54] DIGITAL CONVERGENCE CORRECTING APPARATUS

[75] Inventors: Makoto Shiomi, Yokohama; Michitaka Ohsawa, Fujisawa; Toshiyuki Sakamoto, Fujisawa; Kuninori Matsumi, Fujisawa; Kosuke Ozeki, Yokohama; Ikuo Yuki, Yokohama; Kenji Sato, Yokohama, all of Japan

[73] Assignees: Hitachi, Ltd., Tokyo; Hitachi Video Engineering, Inc., Yokohama, both of Japan

[21] Appl. No.: 302,353

[22] Filed: Jan. 27, 1989

[30] Foreign Application Priority Data

Jan. 29, 1988 [JP] Japan ................................. 63-17101
Aug. 24, 1988 [JP] Japan ................................. 63-208422

[51] Int. Cl.$^5$ ............................................ H04N 9/28
[52] U.S. Cl. ........................................ 358/60; 358/64; 315/368
[58] Field of Search .................... 358/60, 64, 65; 315/368

[56] References Cited

U.S. PATENT DOCUMENTS

| | | | |
|---|---|---|---|
| 2,853,545 | 8/1952 | Rennick | 358/64 |
| 4,395,662 | 7/1983 | Sexton, Jr. | 358/60 |
| 4,668,977 | 5/1987 | Ohno et al. | 358/60 |
| 4,816,908 | 3/1989 | Colineau et al. | 358/60 |
| 4,868,668 | 9/1989 | Tavernetti | 358/60 |

FOREIGN PATENT DOCUMENTS

| | | | |
|---|---|---|---|
| 5068012 | 10/1973 | Japan . | |
| 0018083 | 1/1985 | Japan | 358/64 |
| 61-12191 | 1/1986 | Japan . | |

OTHER PUBLICATIONS

Color Television Textbook, Nippon Hoso Kyokai, pp. 262-265.

Primary Examiner—Howard W. Britton
Assistant Examiner—Kim Yen Vu
Attorney, Agent, or Firm—Antonelli, Terry, Stout & Kraus

[57] ABSTRACT

A convergence correcting apparatus is used in a projection television receiver including a CRT having an aspherical fluorescent screen and a projection lens apparatus which is attached to the display screen of the CRT and has aspherical plastic lenses. In the digital convergence correcting apparatus, a digital memory stores digital correction data corresponding to correction values of convergence adjustments points indicative of a plurality of points on the display screens divided in the horizontal and vertical directions. A multiplexer reads out predetermined digital correction data from the digital memory and time sharingly multiplexes. At least one digital/analog converter receives the time sharingly multiplexed data from the multiplexer and generates an analog signal. Sample and hold circuits extract a predetermined correction signal from the analog output of the digital/analog converter and sample and hold them. The convergence correcting apparatus is driven in accordance with the respective correction signals held by the sample and hold circuits.

10 Claims, 15 Drawing Sheets

FIG. 6
FIG. 7
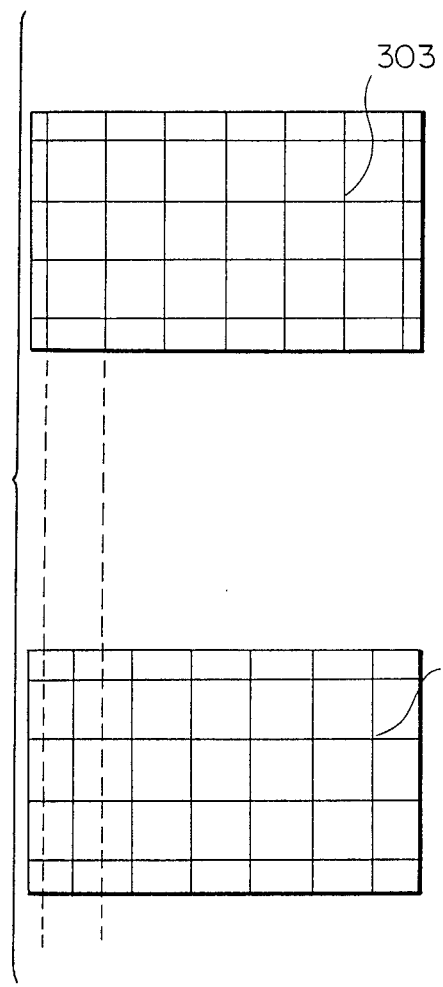
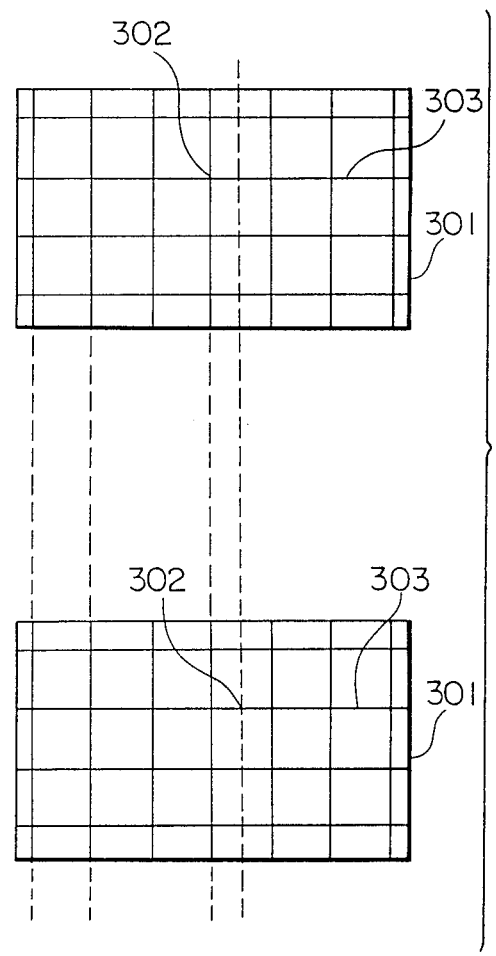

— SOLID LINE : 1ST FIELD

----- BROKEN LINE : 2ND FIELD

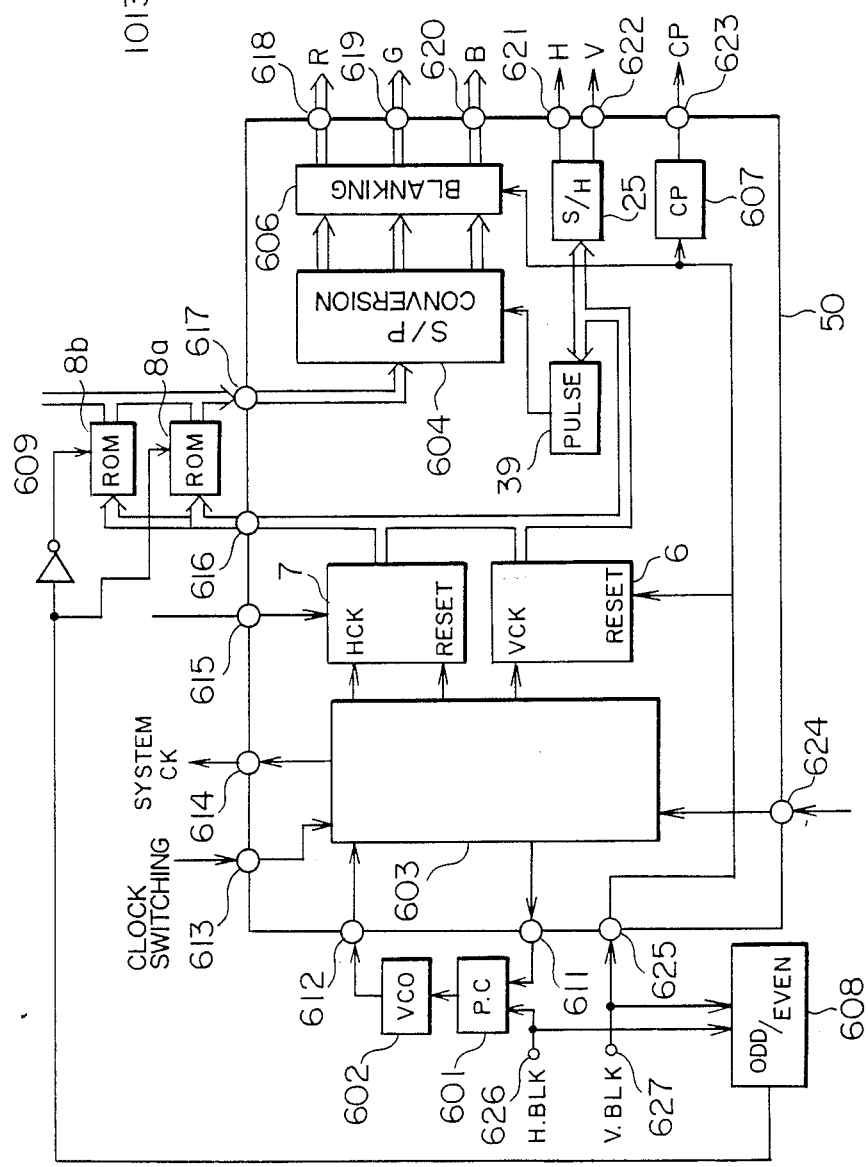

DIGITAL CONVERGENCE CORRECTING APPARATUS

BACKGROUND OF THE INVENTION

The present invention relates to a television receiver having a cathode ray tube (CRT) and, more particularly, to a digital convergence correcting apparatus for correcting a distortion of a projection television receiver and a convergence.

In association with the spread of VTR and video disk players, a desire to see and enjoy a powerful image has grown and a wide screen of a television receiver and a home theater have rapidly been realized. Thus, there has widely been used what is called a projection television in which an image reproduced on the fluorescent screen of the CRT display is enlarged projected onto the display screen by a projection optical system such as lens, mirror, and the like to thereby obtain an image of a large screen.

In a projection television, since aspherical plastic lenses, an aspherical projection tube fluorescent screen, and a short projection optical system are used, the color aberration, spherical aberration, coma aberration, astigmatism, and image surface curve are excellent and the sharpness (focus) of the image is good.

However, the magnifications of respective portions of the screen differ and what is called a distortion in which an object figure and its image are not analogous occurs. With respect to the distortion, it is necessary to consider two parameters such as an absolute value and a distortion of a high order. Generally, in a optical design, the aberration and distortion are contradictory and a compromising point between them is used as a design value.

Therefore, when a focusing performance is raised to a limit value, the distortion increases. particularly, the high-order distortion of the distortion increases. Further, in the projection television, three color lights from three projection tubes of R, G, and B are collected from different angles and an image is formed on the screen. Therefore, convergence performance becomes more complicated with an increase in distortion.

A known method of correcting distortion, analog convergence correction, is disclosed in "Color Television Textbook", Nippon Hoso Kyokai, pages 262 to 265; and the like. According to such method, a sawtooth wave and a parabolic wave which are synchronized with a horizontal sync signal and a vertical sync signal are combined and a correction current is allowed to flow through a convergence yoke (hereinafter, abbreviated to CY), thereby correcting the distortion and the convergence.

However, according to such a method, since there is a limitation in the combination of waveforms, the distortion of the screen and the misconvergence cannot be perfectly corrected.

Therefore, digital convergence correcting apparatus is used for storing an arbitrary waveform according to the complicated distortion into a memory and for converting such into an analog waveform, thereby driving the CY.

In the ordinary conventional digital convergence correcting apparatus, as disclosed in JP-A-50-68012 and JP-A-61-12191, by providing one D/A converter for each of the CY to be driven and the convergence coil, the correction is accomplished. In the television receiver which needs a number of CYs and convergence coils, the number of D/A converters is at least equal to the number of channels.

The digital convergence correcting apparatus can correct at a high accuracy the complicated distortions and misconvergence which occur when using the aspherical plastic lenses, aspherical projection tube fluorescent screen, and short projection optical system.

However, to realize the digital processes, the circuit scale increases and the D/A converters equal in number to the number of CYs which are driven are needed. Particularly, in a system such as a projection television or the like using a number of CYs to be driven, there is a problem which arises in that the circuit scale and the cost increase.

On the other hand, there is also a problem such that each of the D/A converters generally generate a glitch as a pulse-like noise in the analog output voltage and an interference is created such that a desired analog waveform cannot be obtained.

SUMMARY OF THE INVENTION

It is an object of the present invention to provide a digital convergence correcting apparatus in which the number of D/A converters is reduced, the digital section is constructed as a highly integrated circuit, it is possible to cope with the television signal of each system, the cost is low, and the high performance is obtained.

The object of the invention is accomplished by a digital convergence correcting apparatus having a multiplexer for time sharingly multiplexing two or more kinds of correction data trains stored in a memory, a D/A converter for converting the multiplexed digital signal into analog signal, and a sample and hold (S/H) circuit for sampling the analog correction waveform as an output of the D/A converter by only the number of channels which are inherently necessary, wherein the sampling process is executed by the S/H circuit while avoiding the glitch which is generated by the D/A converter.

Further, the digital section of the correcting apparatus is constructed as an integrated circuit and it is also possible to easily cope with the NTSC normal speed or the deflection of the TV signal of an ID (Improved Definition) TV or the like by switching the address designation clock in the memory.

In the digital convergence correcting apparatus, two or more kinds of correction data trains to drive the convergence coils which are stored in the memory are time sharingly multiplexed to one correction data train by the multiplexer. At this time, the one multiplexed correction data train is converted into the analog signal by one D/A converter and one time sharingly multiplexed analog waveform is output.

Therefore, the time sharingly multiplexed analog waveform is sampled by the S/H circuits as many as the number of multiplexed correction data trains.

Thus, the output analog waveform of each channel becomes a multi-channel correction waveform without a glitch.

On the other hand, by switching in the IC the address designation clock in the memory, it is possible to cope with the normal speed, ID, and the like without changing the parts which are attached to the IC from the outside. The cost can be reduced because of the common use of the circuit board.

BRIEF DESCRIPTION OF THE DRAWINGS

FIG. 6 is a diagram showing the phase of the cross hatch which is switched at the time of the adjustment;

FIG. 7 is a diagram showing the phases of the markers;

FIG. 17 is a system block diagram constructed as an IC and showing another embodiment of the invention;

FIG. 18 is an arrangement diagram of a projection television to which the invention is applied.

DESCRIPTION OF THE PREFERRED EMBODIMENTS

The first embodiment of the present invention will be described hereinbelow with reference to FIG. 1.

Figure 1:
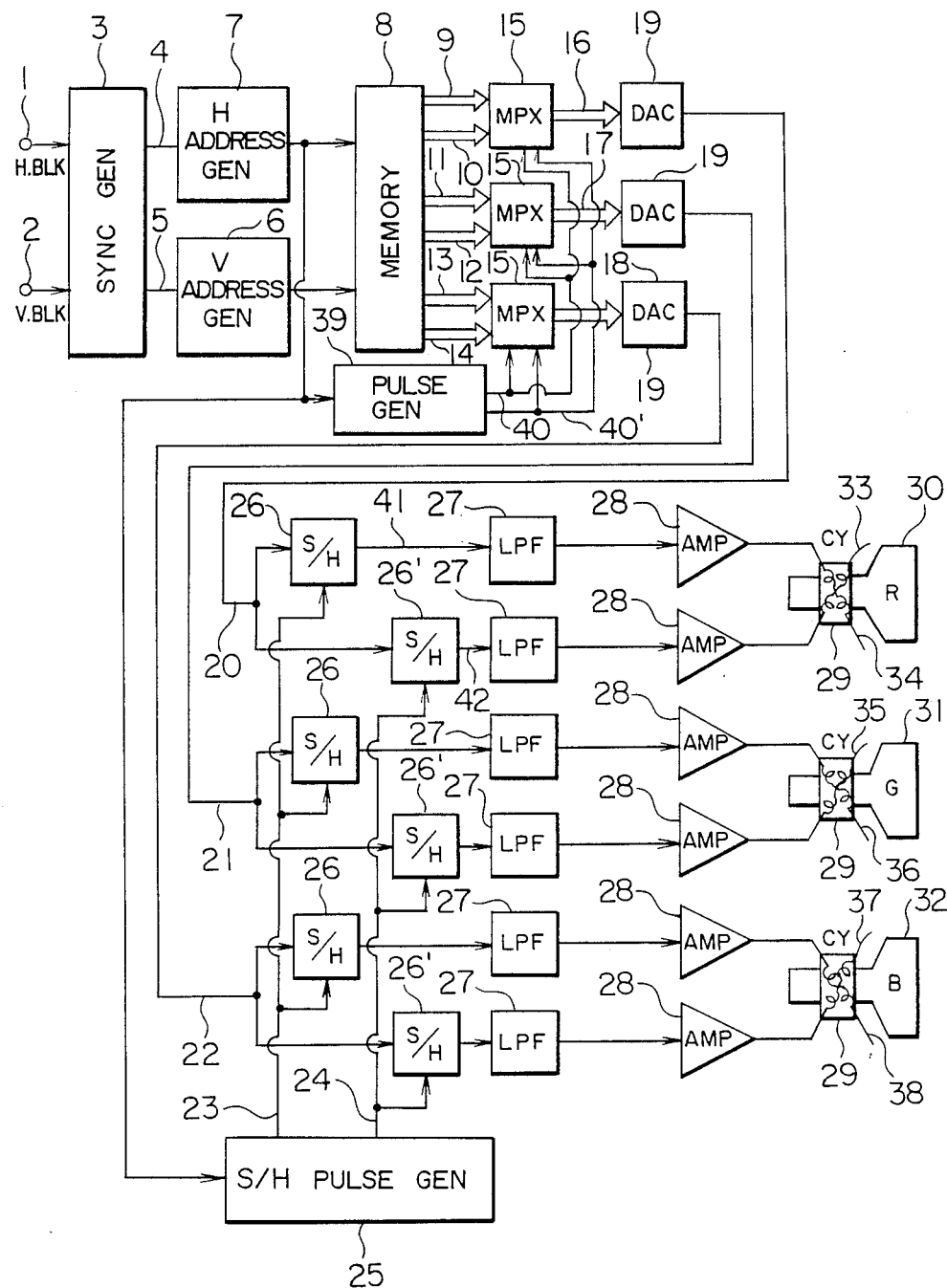
FIG. 1 is a block diagram showing a fundamental arrangement of the first embodiment of the present invention.

FIG. 1 shows a fundamental arrangement in the case where a digital convergence correcting apparatus of the invention is applied to a projection television of the three-tube type. In the diagram, reference numerals 1 and 2 denote a horizontal blanking pulse (H. BLK) and a vertical blanking pulse (V. BLK) in a raster scan; 3 a sync generator to form system clocks synchronized with those pulses and pulses 4, 5 which are necessary for an address counter; 6 and 7 are a V address generator and an H address generator to generate read addresses in a memory 8; 9 and 10 correction value data serving as signals to drive a horizontal convergence coil 34 and a vertical convergence coil 33 which are assembled in an R projection tube 30 and wound around a CY 29; 11 and 12 correction value data serving as signals to drive a horizontal convergence coil 36 and a vertical convergence coil 35 of a G projection tube 31; and 13 and 14 correction value data serving as signals to drive a horizontal convergence coil 38 and a vertical convergence coil 37 of a B projection tube 32. Reference numeral 15 denotes a multiplexer for time sharingly multiplexing two data trains by pulses 40 and 40' formed by a pulse generator 39; and 16, 17, and 18 represent multiplexed data values which are obtained by time sharingly multiplexing the correction value data 9 and 10, 11 and 12, and 13 and 14 by the multiplexer 15, respectively. Reference numeral 19 denotes D/A converters (DACs) to convert the multiplexed digital data into analog signals 20, 21, and 22; 26 indicates sample and hold (S/H) circuits to convert the multiplexed analog signals into the original individual signal waveforms; and 25 is a sample and hold pulse generator to generate sample and hold pulses 23 and 24 having different phases to drive the S/H circuits. Reference numeral 27 indicates low pass filters (LPFs) for interpolation and 28 represents CY amplifiers to drive the CYs.

Figure 2:
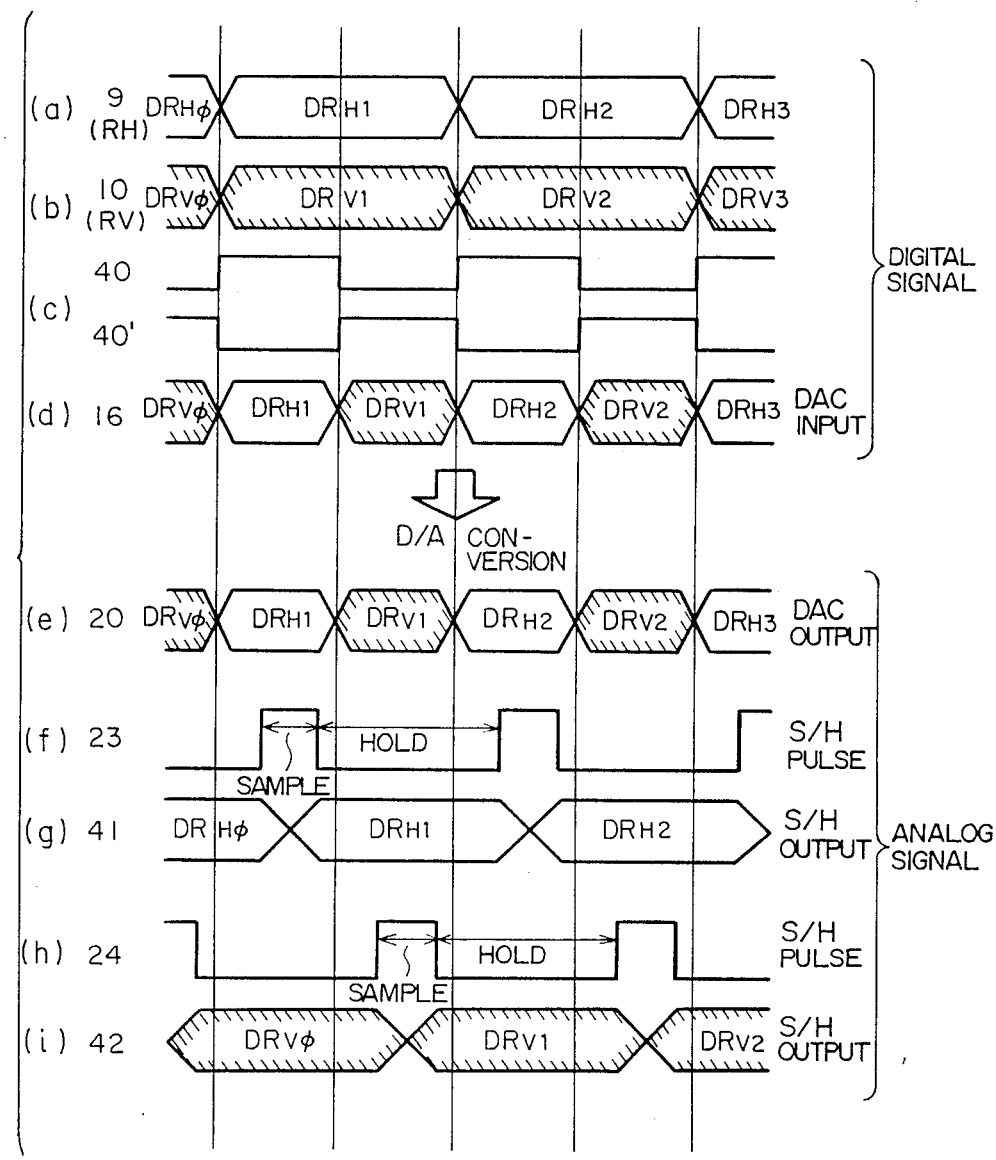
FIG. 2 is a time chart showing the timings of main signals in the circuit of FIG. 1.

FIG. 2 is a time chart showing the timings of the main signals in the circuit shown in FIG. 1.

It is now assumed that the correction value data trains 9 and 10 which were read out from the memory 8 by address signals are based on the timings shown in FIGS. 2(a) and 2(b). The correction value data train has a format in which n correction value data at respective points on the screen were time sharingly multiplexed. The correction value data trains 9 and 10 are the data trains of $DR_{Hi}$ and $DR_{Vi}$ ($i=0, 1, 2, \ldots, n$).

The multiplexer 15 in FIG. 1 periodically selects the input correction data trains 9 and 10 to the multiplexer 15 by the selection input signals 40 and 40' shown in FIG. 2(c), thereby obtaining the output multiplexed data train 16 shown in FIG. 2(d). That is, the two data trains 9 and 10 are time divided and multiplexed into one data train.

The multiplexed data train 16 is then input to the D/A converter 19 in FIG. 1, so that the analog signal 20 shown in FIG. 2(e) is derived. From the analog signal 20, analog signal 41 of DRH and an analog signal 42 of $DR_v$ shown in FIGS. 2(g) and 2(i) are extracted by sample and hold circuits 26 and 26' which are driven by the sample and hold pulses 23 and 24 shown in FIGS. 2(f) and 2(h) whose phases are different by 180°, that is, ½ period of the period of the correction data train, respectively.

In such a case, by properly selecting the phase conditions of the sample and hold pulses 23 and 24 to drive the S/H circuits, the glitch which is generated in the output analog signal of the D/A converter can be also eliminated.

Figure 3:
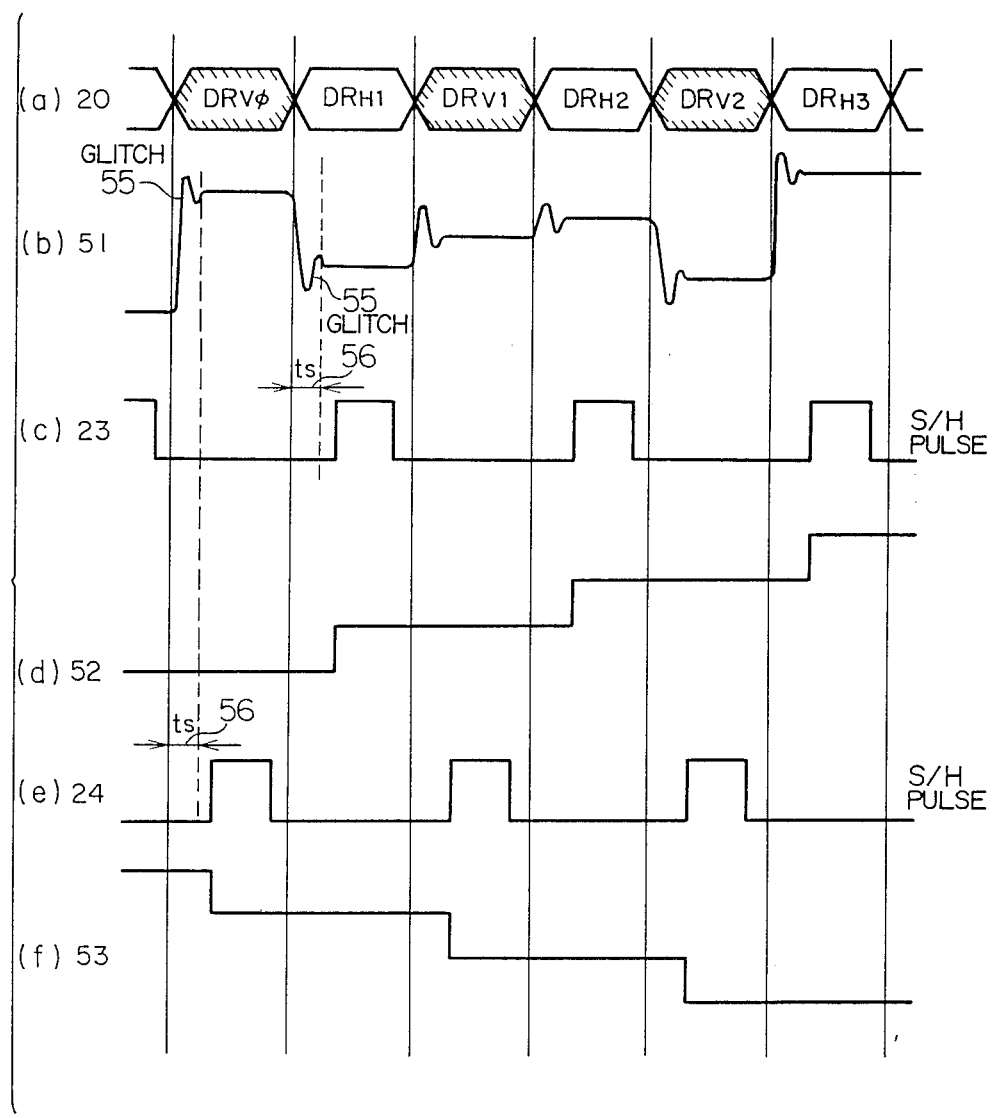
FIG. 3 is a principle diagram showing the timings of the diglitch by an S/H circuit.

That is, as shown in FIG. 3, it is now assumed that the multiplexed analog signal of FIG. 3(a) has waveform 51 shown in FIG. 3(b). A glitch 55 as pulse-like noise which is caused due to a deviation of the timing of a current switch of the D/A converter or the like is generated in the change portion of the waveform 51. The waveform of the glitch i settled to a stationary state with a predetermined settling time $t_s$ as shown by 56 in FIGS. 3(c) and 3(e). Therefore, if the sampling times of the sample and hold pulses 23 and 24 are set after the settling time $t_s$ of the glitch, the output waveforms become normal analog waveforms 52 and 53 without the noise due to the glitch as shown in FIGS. 3(d) and 3(f).

That is, by using the digital convergence system of the invention shown in FIG. 1, in the television system which needs the CYs of six channels, six D/A converters is many as the number of channels which have conventionally been needed can be reduced to three D/A converters. At the same time, the glitch of the analog signal waveform to drive the CY can be also eliminated.

Thus, the digital convergence correcting apparatus of a small scale, low cost, and high performance can be realized.

In FIGS. 1 to 3, the case where the data to correct the distortion and convergence of the screen have already been written in the memory 8 has been described. An adjusting method of a screen raster using the digital convergence correcting apparatus will now be described with reference to FIGS. 4 to 7.

Figure 4:
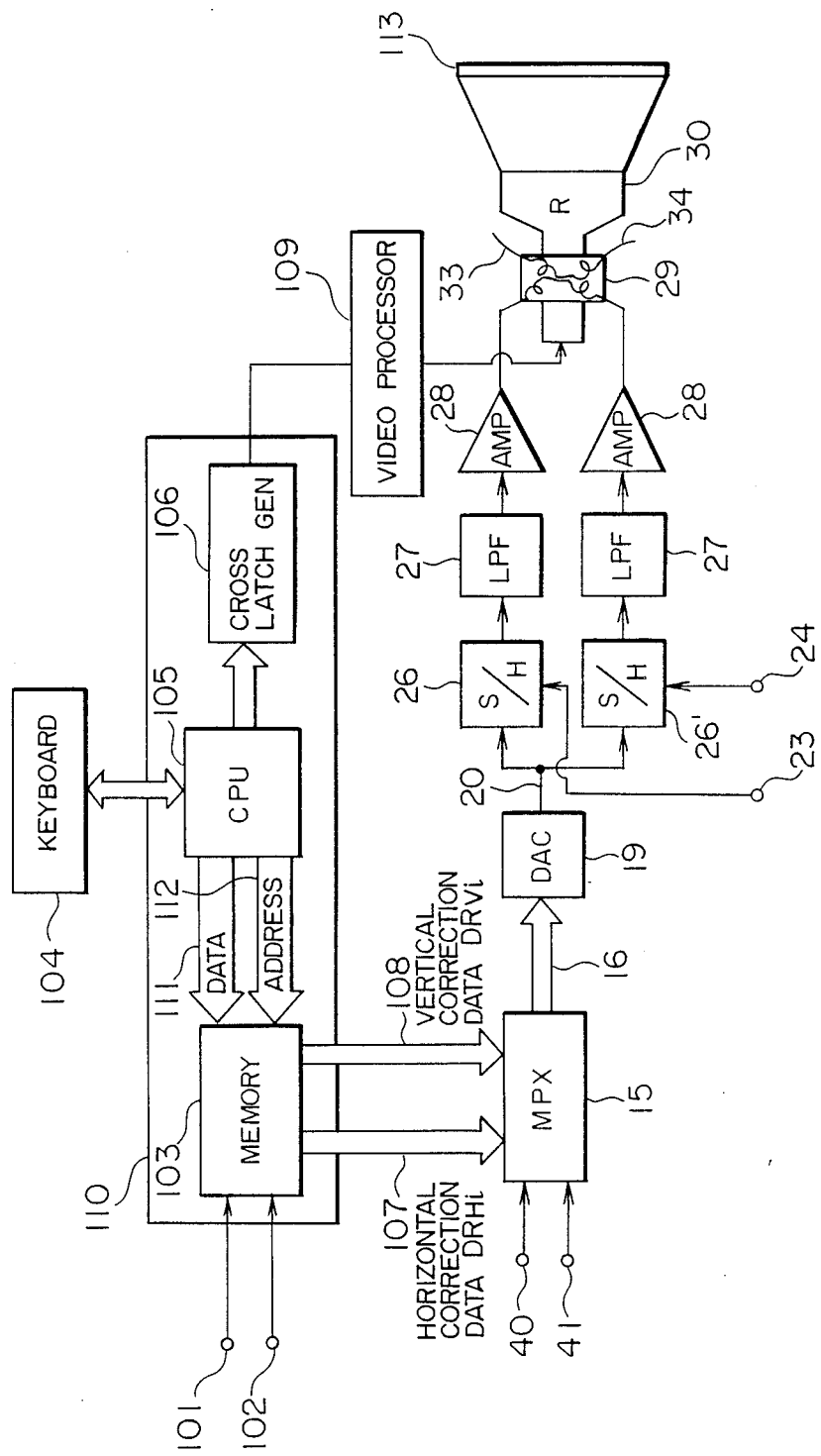
FIG. 4 is a block diagram showing an arrangement at the time of the adjustment in the first embodiment.

FIG. 4 is a diagram showing a fundamental arrangement upon adjustment of the digital convergence correcting apparatus in the present invention. A CPU 105 is connected to a memory 103, a keyboard 104, and a cross hatch generator 106. A cross hatch signal obtained by the cross hatch generator 106 is transmitted through a video processor 109 and the cross hatch is displayed on a projection screen 113. (The case where only the red (R) raster is projected will be explained for simplicity of explanation.)

A person who intends to adjust operates the keyboard 104 while looking at the cross hatch displayed on the projection screen 113 and selects the position where the convergence correction is necessary and corrects the vertical and lateral line rasters and sets correction amounts in the horizontal and vertical directions. Then, an address 112 corresponding to the correcting position is designated in the memory 103 and the correction amount data is written into the memory. The written data is read out to a horizontal correction data train 107 ($DR_{Hi}$) and a vertical correction data 108 ($DR_{Vi}$) by an H address signal 101 and a V address signal 102 which are synchronized with the deflecting system and obtained by the address generators 6 and 7 in FIG. 1. In a manner similar to the case explained in FIGS. 1 to 3, the read data is time sharingly multiplexed by the multiplexer 15 and is converted into the analog signal by the D/A converter 19. The diglitch is again extracted by the S/H circuit 26 and the CY 29 is driven.

Figure 5:
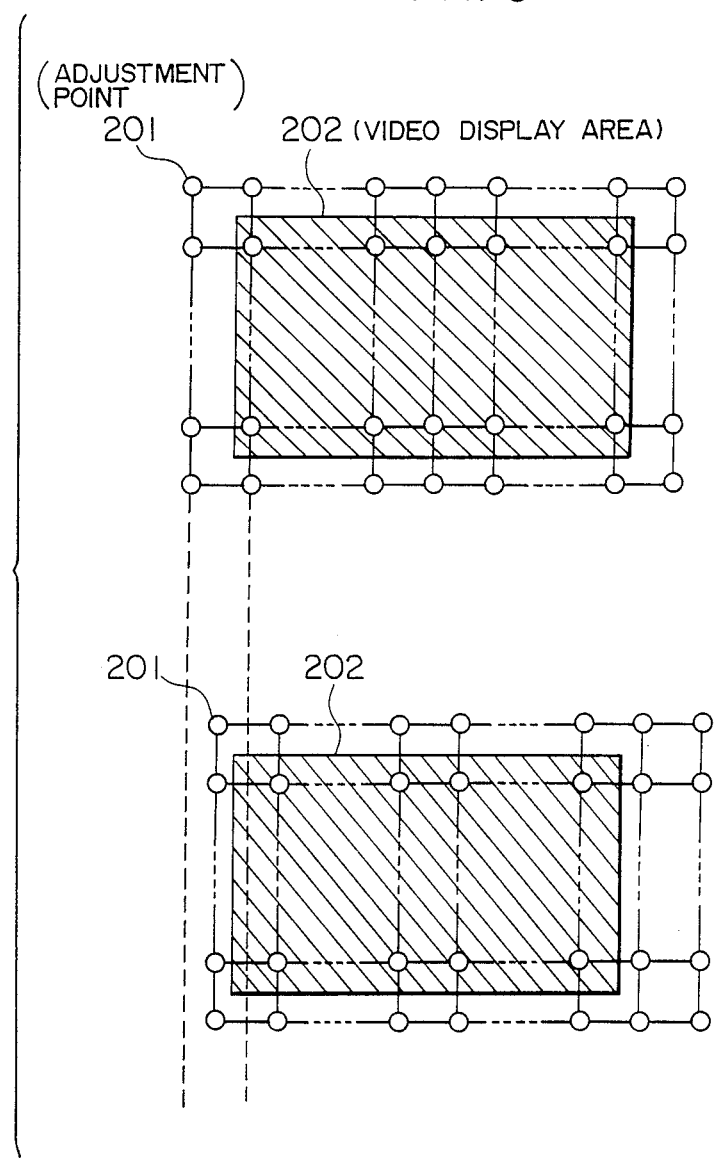
FIG. 5 is a diagram showing the phases at adjustment points.

However, as also shown in FIG. 2, in the embodiment, the correction data in the horizontal and vertical directions are multiplexed and the phases of the outputs 41 ($DR_{Hi}$) and 42 ($DR_{Vi}$) extracted by the S/H circuit are deviated by ½ period of the data period. Now, assuming that the adjacent data $DR_{Hi}$ and $DR_{Hi+1}$ and the adjacent data $DR_{Vi}$ and $DR_{Vi+1}$ indicate the adjustment points which are neighboring in the horizontal direction on the screen, the adjustment points of DRH and DRV are deviated by ½ of the interval between the adjustment points. Such a deviation will now be described with reference to FIG. 5. In the diagram, reference numeral 201 denotes adjustment points and 202 indicates a video display area, namely, a screen frame. The upper portion of FIG. 5 is a diagram showing the adjustment points having the correction data train $DR_{Hi}$ in the horizontal direction on the screen. The lower portion of FIG. 5 is a diagram showing the adjustment points having the correction data train $DR_{Vi}$ in the vertical direction on the screen. That is, as shown in the diagram, the phase difference of only ½ of the interval between adjustment points at the position in the horizontal direction occurs between the adjustment point in the case of performing the correction in the horizontal direction and the adjustment point in the case of executing the correction in the vertical direction.

Therefore, upon adjustment, in order to make the adjustment easy, by controlling the cross hatch generator 106 in the adjusting apparatus shown in FIG. 4 by the CPU 105, the phase of cross hatch is automatically switched in accordance with the adjustment in the horizontal direction and the adjustment in the vertical direction as shown in FIG. 6. In FIG. 6, reference numeral 301 denotes a screen frame and 303 indicates a cross hatch raster on the screen. That is, the cross hatch of the phase shown in the upper portion of FIG. 6 is used upon adjustment in the horizontal direction. The cross hatch of the phase shown in the lower portion of FIG. 6(b) is used upon adjustment in the vertical direction.

On the other hand, in the case of providing a marker 302 to indicate an adjusting position onto the cross hatch, as shown in FIG. 7, only the phase of the marker can be switched in accordance with the correction in the horizontal direction and the correction in the vertical direction without switching the phase of the cross hatch itself.

The fundamental system of the present invention has been described above. The system will now be further practically explained hereinbelow.

Particularly the system will be described mainly with respect to the following points.

(1) Realization of an IC of the logic section
(2) Method of generating the address designation clocks in the memory
(3) Correspondence to various kinds of signals First, to explain the invention, the relation between the memory 8 and a display screen 60 will be described with respect to the case of the NTSC signal.

Figure 11:
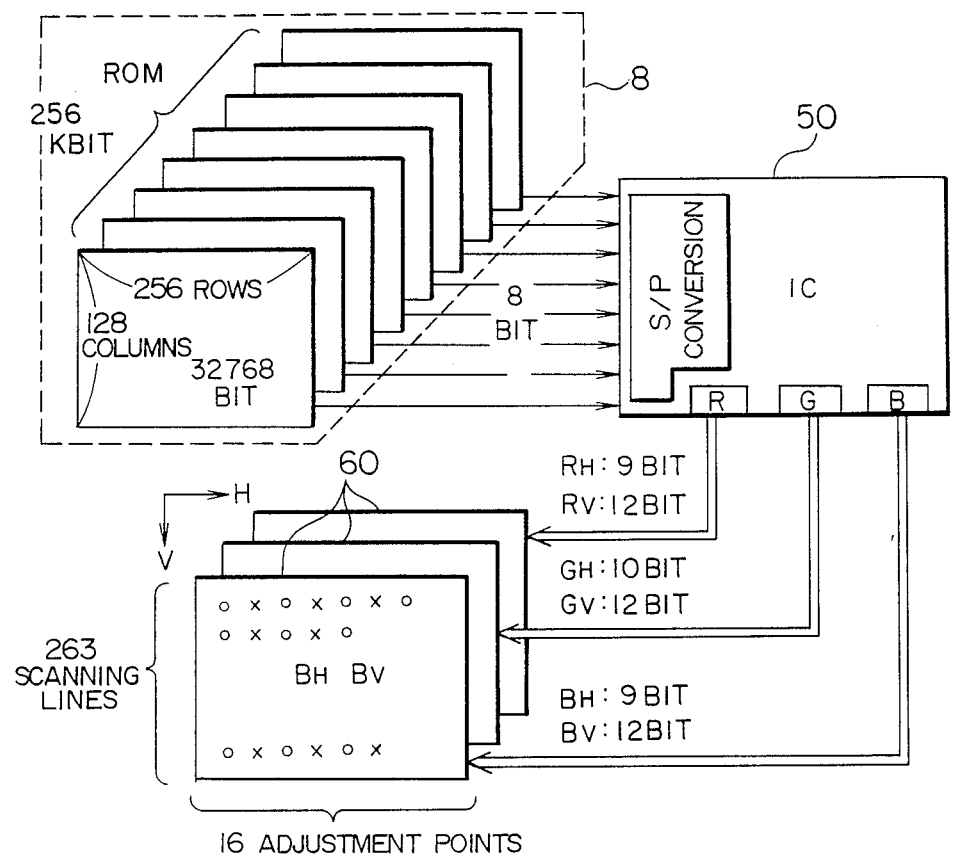
FIG. 11 is an explanatory diagram for explaining the relation between a memory and a screen.

FIG. 11 shows the relation between the memory 8 to store the correction data and the screen 60. The number of digitization bits of the correction data is set to 12 bits in the vertical direction (V), 10 bits in the case of G in the horizontal direction (H) and 9 bits in the cases of R and B in the (H) direction. On the other hand, 16 correction points are necessary in the horizontal direction and the correction points as many as the number of scanning lines are needed in the vertical direction.

The memory capacity is calculated from the above conditions.

Memory capacity = (the number of necessary bits per correction point) × (the number of correction points in the horizontal direction) × (the number of correction points in the vertical direction) = 64 bits (12 bits × 3 + 9 bits × 2 + 10 bits) × 16 × 263 = 269312 bits Since the correction is unnecessary for about 7% of the vertical blanking period, the general memory capacity of 256 kbits is sufficient as the memory capacity. For the general memory capacity of 256 kbits, since the parallel 8-bit output is the main stream, the rows and the scanning lines are made correspond and, thereafter, the serial conversion is executed in an IC 50.

The data in the memory 8 is stored in correspondence to the addresses designated by rows and columns. In the invention, the data is made correspond to the row address every scanning line. That is, a row address counter counts the horizontal BLK pulses and a column address counter counts reference clocks CK whose phases were synchronized with the horizontal BLK pulses.

Further, the row address counter is reset by the vertical BLK pulse and the column address counter is reset by the horizontal BLK pulse.

That is, the row address counter corresponds to the V address generator 6 shown in FIG. 1 and the column address counter corresponds to the H address generator 7 shown in FIG. 1. (It is also obviously possible to design in a state in which the rows and columns are exchanged.)

The construction of the memory address counter and the clocks are the significant factors in designing the system.

When realizing the present invention, the large logic section is constructed as an IC. When forming the IC, an attention is particularly paid to the variety.

As is well known, in the standard of the television system, there exist various kinds of systems such as not only the NTSC system but also the PAL system, SECAM system. IDTV (Improved Definition TV) in which the picture quality in the NTSC system is improved system, and the like.

In the case of performing the digital convergence of the above systems, the following various kinds of parameters exist.

(1) The number of scanning lines and the scanning period
(2) The interlace and the non-interlace
(3) The relation between the horizontal sync signal and the memory read clock
(4) and the like Therefore, when the system is designed and its IC is formed every system, it is disadvantageous in terms of the cost of the IC and is, further, disadvantageous with regard to the cost of the circuit board on which peripheral parts are installed.

It is necessary to establish the multi-function technique to process various specifications by the same IC and same board.

An explanation will now be made hereinbelow with regard to an IC constructed by considering the variety.

Figure 12:
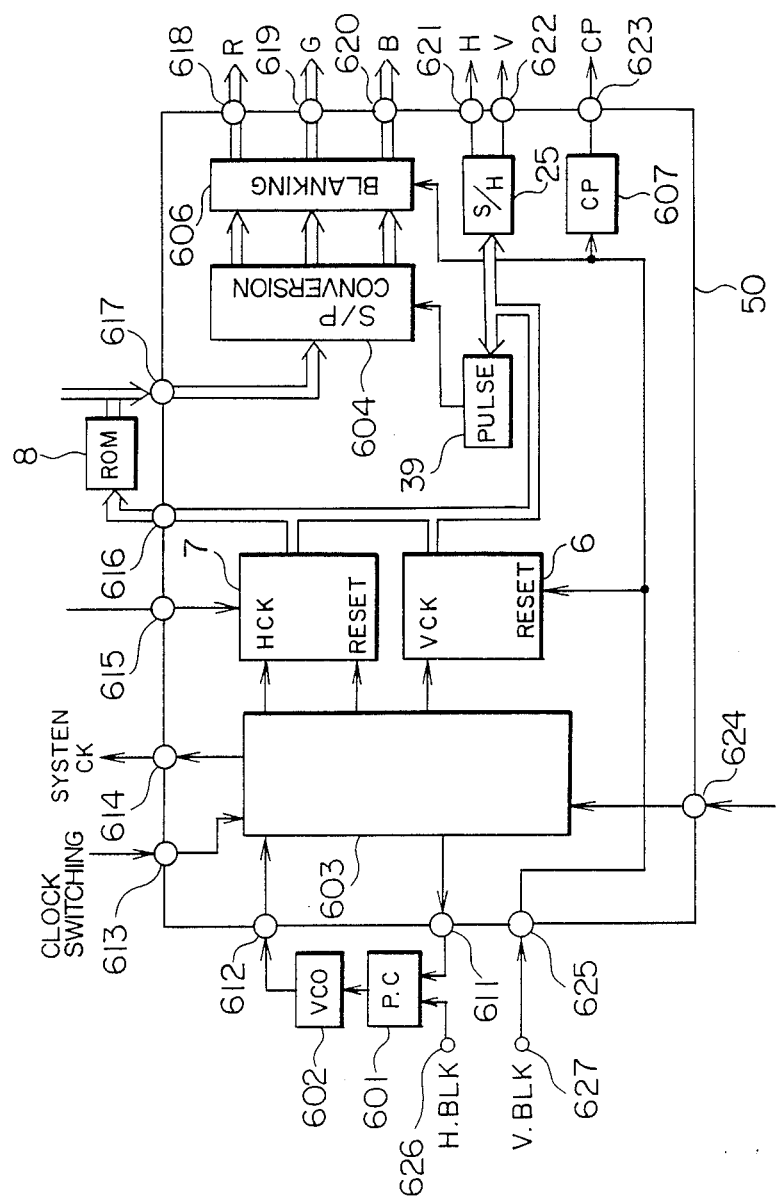
FIG. 12 is a system block diagram in the case where the present invention is realized as an IC.

FIG. 12 is a system block diagram in the case where the digital block shown in FIG. 1 is constructed as an IC.

A phase comparator 601 including a low pass filter (LPF), a voltage controlled oscillator (VCO) 602, and a frequency divider block 603 construct a phase locked loop (PLL) and generate system clocks synchronized with the H. BLK.

Each of the H address generator 7 and V address generator 6 consists of a counter.

A serial/parallel converter 604 converts the serial data in the ROM 8 into the parallel data and, further, performs the multiplexing process by using pulses formed by the pulse generator 39.

The S/H pulse generator 25 generates pulses which are given to the S/H circuits (26 in FIG. 1).

On the other hand, a blanking circuit 606 sets the blanking portion in the screen to a predetermined DC voltage value The predetermined DC voltage of the blanking portion is clamped by a clamp pulse formed by a clamp pulse generator 607.

Figure 13:
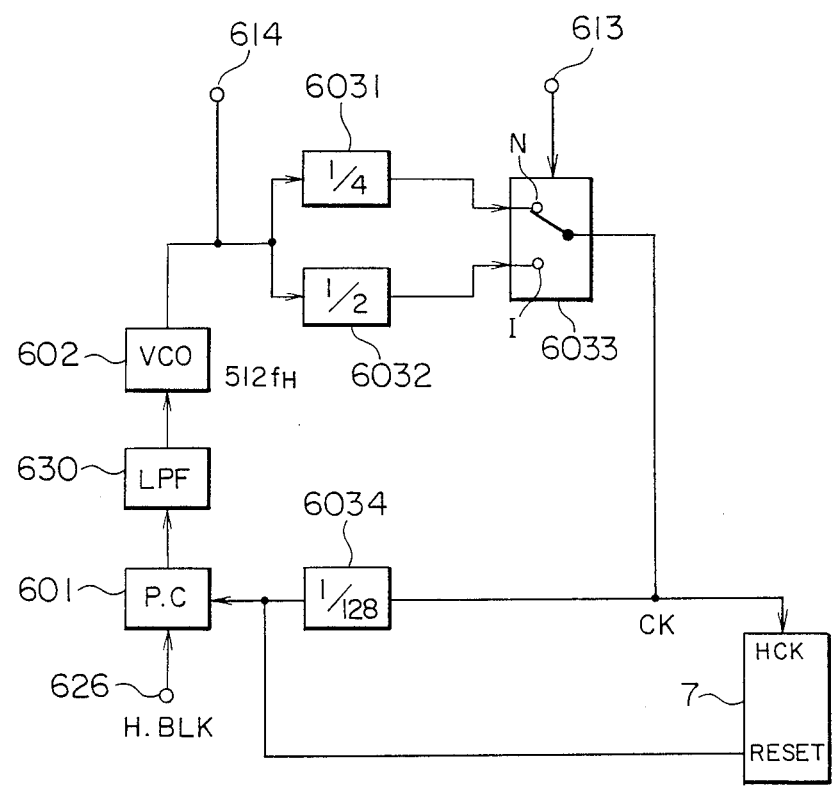
FIG. 13 is a peripheral clock generating block diagram of an H address generating circuit.

FIG. 13 is a diagram for explaining mainly a block to generate clocks HCK of the H address generator and horizontal sync pulses H for resetting. The phase detector 601, an LPF 630, the VCO 602, and frequency dividers 6031, 6032, and 6034 construct a PLL. Reference numeral 6033 denotes a The H. BLK is input to a terminal 626. In the phase comparator 601, the phase of the input H. BLK is compared with that of a signal from the frequency divider 6034. An output of the phase detector 601 oscillates the VCO 602 through an LPF 620.

The center frequency of the VCO 602 is set to 512 $f_H$ ($f_H = 15.7$ kHz). When the switch 6033 is switched as shown in the diagram, the HCK is set to the frequency of 128 $f_H$. Further, the HCK is frequency divided into 1/128 by the frequency divider 6034. The clock of the frequency $f_H$ is input to the phase detector 601.

The memory reading time is as follows.

Memory reading time $$\text{Memory reading time} = \frac{\text{(horizontal scanning period)}}{\left(\begin{array}{c}\text{The number of}\\\text{correction points}\\\text{in the horizontal}\\\text{direction}\end{array}\right) \cdot \left(\begin{array}{c}\text{The number of}\\\text{time sharing}\\\text{processes}\end{array}\right)}$$

$$= \frac{1/f_H}{16 \times 18} = \frac{1}{128 f_H}$$

The case of the IDTV will now be described.

In the IDTV, as is well known, the interlace is not performed and sixty still images each of which is constructed by 525 scanning lines are displayed for one second.

The frequency of the horizontal sync signal is Set to $2f_H$. Assuming that the number of correction points in the horizontal direction is the same number of sixteen as that in the standard system, $$\text{Memory reading time} = \frac{\frac{1}{2}f_H}{16 \times 18} = \frac{1}{256 f_H}$$

Therefore, it is sufficient to count the addresses in the memory by the clocks of the frequency of 256 $f_H$.

When the switch 6033 is connected to the I side, the frequency divider 6032 is used, so that the HCK is set to the frequency of 256 $f_H$. Since the HCK is further frequency divided into 1/128 by the frequency divider 6034, the clock of the frequency of 2 $f_H$ is input to the phase detector 601.

The switch 6033 can be easily switched to the N or I side by controlling an input terminal 613 of the IC 50.

As mentioned above, by assembling the frequency divider block 603 in the IC and enabling the frequency dividing ratio to be switched, the modes for the NTSC standard and the IDTV can be easily switched without changing the free run frequency of the externally attached VCO 602.

An LC oscillator or CR oscillator is generally used as the VCO 602. Since there is no need to change the free run frequency to the values of L, C, and R in accordance with the modes of the NTSC standard and IDTV, there is a large advantage in manufacturing of the apparatus.

Further, the output of the VCO 602 is set to the frequency of 512 $f_H$ in both of the NTSC standard and the IDTV and the clock is sent as a system clock to an adjusting apparatus 110 through a terminal 614. Thus, the adjusting apparatus does not need to switch the system clock in both of those modes. There is a large advantage in designing.

Figure 14:
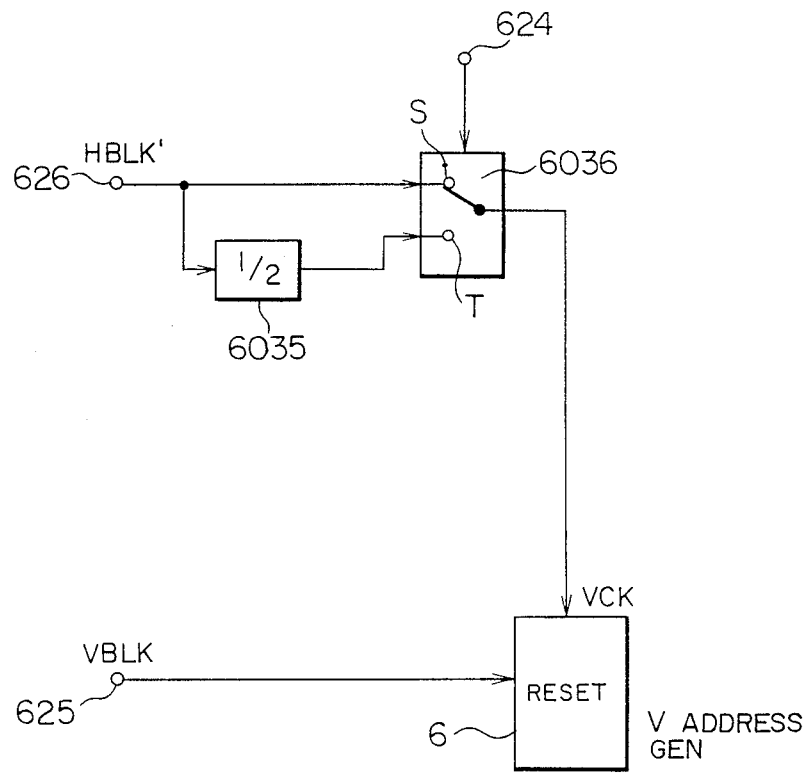
FIG. 14 is a peripheral clock generating block diagram of a V address generating circuit.

The content of the frequency divider block 603 will now be described mainly with respect to the V address generator 6 with reference to FIG. 14.

The frequency divider block 603 is constructed so as to cope with the mode to reduce the memory capacity.

An output signal of the frequency divider 6034 is input to the terminal 626. That is, the output signal which is phase synchronized with the HBLK by the PLL is input and is referred to as an HBLK'.

When a switching circuit 6036 is connected as shown in the diagram, the HBLK' is directly input as a VCK to the V address generator 6. The V address generator 6 is reset by the VBLK which is input from terminal 625.

When the terminal of the switching circuit 6036 is connected to the T side, the HBLK' is frequency divided into $\frac{1}{2}$ and the resultant clock having the $\frac{1}{2}$ frequency of the HBLK' is input as the VCK to the V address generator 6. Thus, the address of the V address generator 6 is updated every two scanning lines.

Figure 15:
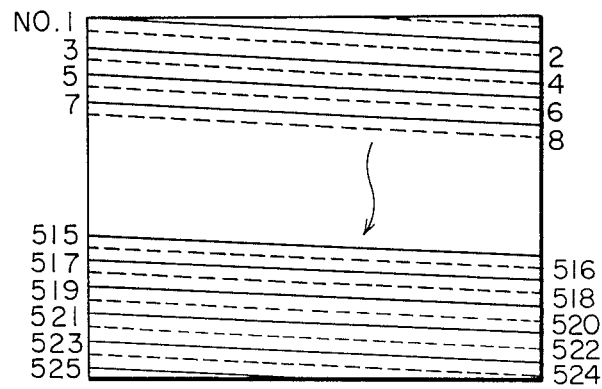
FIG. 15 is an explanatory diagram of the scanning lines at the NTSC normal speed.
Figure 16:
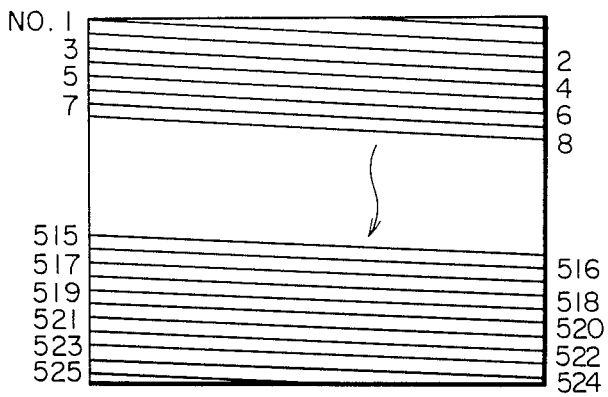
FIG. 16 is an explanatory diagram of the scanning lines in the case of the IDTV.

The operation in the state shown in the diagram will now be further described with reference to FIG. 15 showing the state of the scanning lines in the normal speed mode and FIG. 16 showing the state of the scanning lines in the IDTV mode.

FIG. 15 shows the scanning state in the NTSC standard mode. As is well known, there is performed the interlace scan such that an animation image is dissolved into thirty still images (frames) for one second and each still image is further dissolved into two images (fields).

In the digital convergence for generating the correction waveform in correspondence to the scanning lines, the correction data corresponding to the 525/2 scanning lines are inherently necessary for the odd and even fields, respectively.

However, the first and second fields shown in FIG. 15 are closely arranged and there is a high correlation between the correction waveforms. Therefore, to reduce the memory capacity into $\frac{1}{2}$, the correction data of only either one of the odd and even fields is used.

That is, the same correction data can be used for each of the scanning lines Nos. 1 and 2, Nos. 3 and 4, ..., etc.

In the case of the IDTV, since the number of scanning lines is twice as large as that in the NTSC standard mode, if the correction data is made correspond every scanning line, the double memory capacity is necessary. That is, in the case of providing different data for each of the scanning lines Nos. 1 and 2, Nos. 3 and 4, ... in FIG. 16, it is necessary to use the ROM having the memory capacity of 512 kbits.

However, when considering similarly to the case of the NTSC normal speed mode, that is, when an attention is paid to a point that there is a high correlation between the correction data of the adjacent signal, even in the case of the IDTV, the same correction data can be used for each of the scanning lines Nos. 1 and 2, Nos. 3 and 4, ..., etc.

To realize such a method, the counter of the V address generator is allowed to count every two scanning lines. Such a counting operation can be realized by controlling a terminal 624 in FIG. 14.

As mentioned above, in the case of performing the correction corresponding to the whole scanning lines without reducing the memory capacity in the IDTV mode, it is sufficient to use the terminal T of the switch 6036. On the contrary, the terminal S is used in the case of reducing the memory capacity.

Since the terminals 613 and 624 are independently controlled, for instance, it is also possible to connect the switch 6033 to the N side and to connect the switch 6036 to the T side in the NTSC normal speed mode. In such a case, the memory capacity is set to 128 kbits in the normal speed mode.

When considering in a manner similar to the above, by reducing the frequency dividing ratio of the frequency divider 6035 into 1/n (n is an integer), the memory capacity can be obviously reduced into 256/n kbits.

Another embodiment will be described with reference to FIG. 17. In the foregoing embodiment (FIG. 12), in the case of the NTSC standard mode, the correction has been executed every field irrespective of the odd and even fields.

FIG. 17 shows an example in which the correction data is given every field. The odd field and even field are discriminated and memories 8a and 8b corresponding to them are used.

The odd and even fields are distinguished by a discriminating circuit 608 on the basis of the relation between the phases of the H. BLK and V. BLK. In the case of the odd field, a high level signal is given to an enable terminal of the ROM 8a. Since an inverter 609 is connected to an enable terminal of the ROM 8b, the ROM 8b does not operate in the case of the odd field. In the case of the even field, the ROM 8b is selected by the opposite operation.

The memories 8a and 8b are not necessarily provided for different chips but the similar operation can be also realized by changing the MSB of the address on the same chip.

The case where both of the H. BLK and V. BLK are used as the input signals of the sync generator has been described above. However, it is sufficient to use the pulses whose phases are synchronized with the horizontal and vertical sync signals of the video signal. The H. BLK and V. BLK have been used merely for making the explanation easy.

The second embodiment will now be explained with reference to FIGS. 8 and 9. The same parts and components as those shown in FIGS. 1 and 2 are designated by the same reference numerals.

Figure 8:
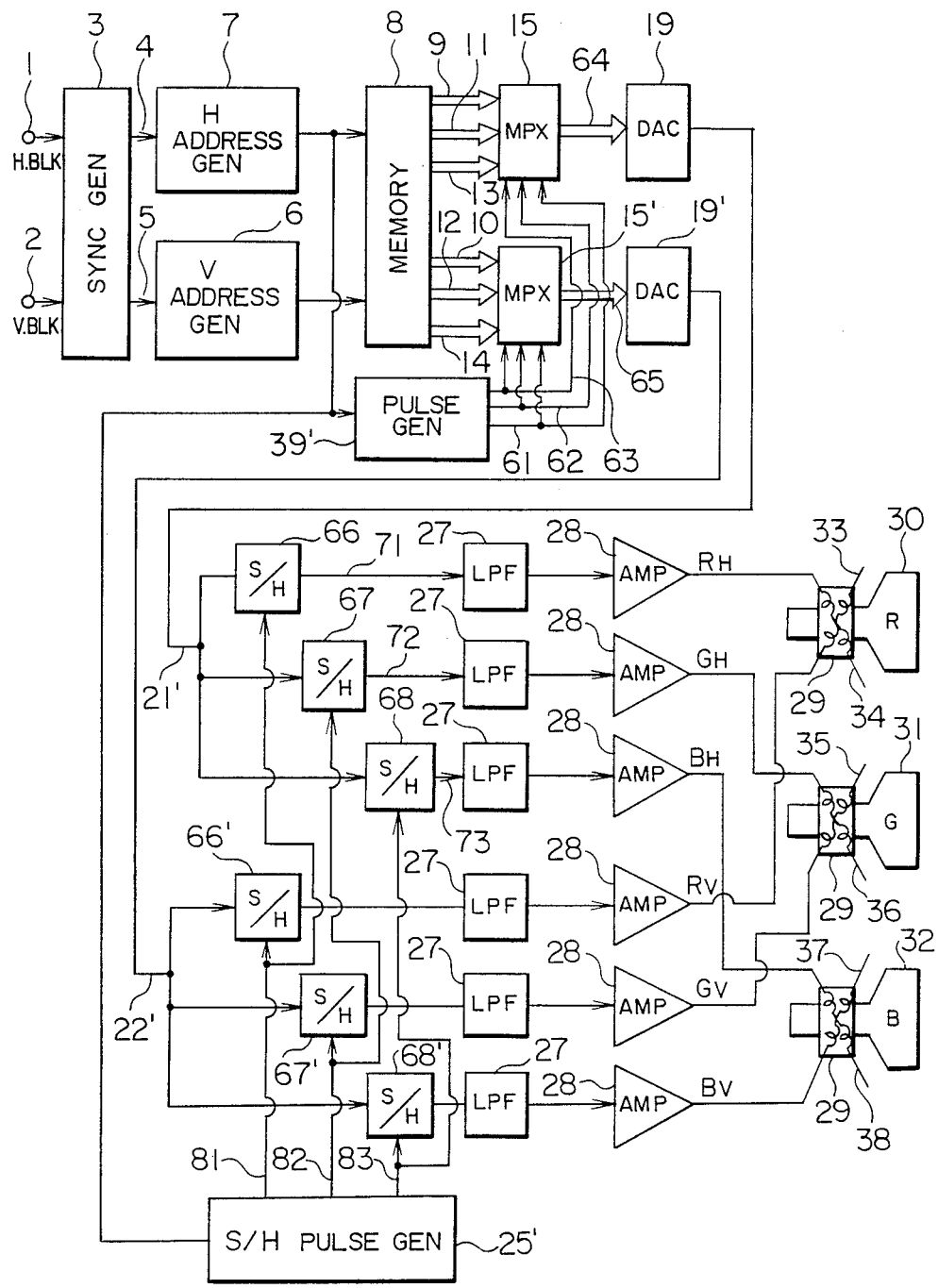
FIG. 8 is a block diagram showing a fundamental arrangement of the second embodiment of the invention.
Figure 9:
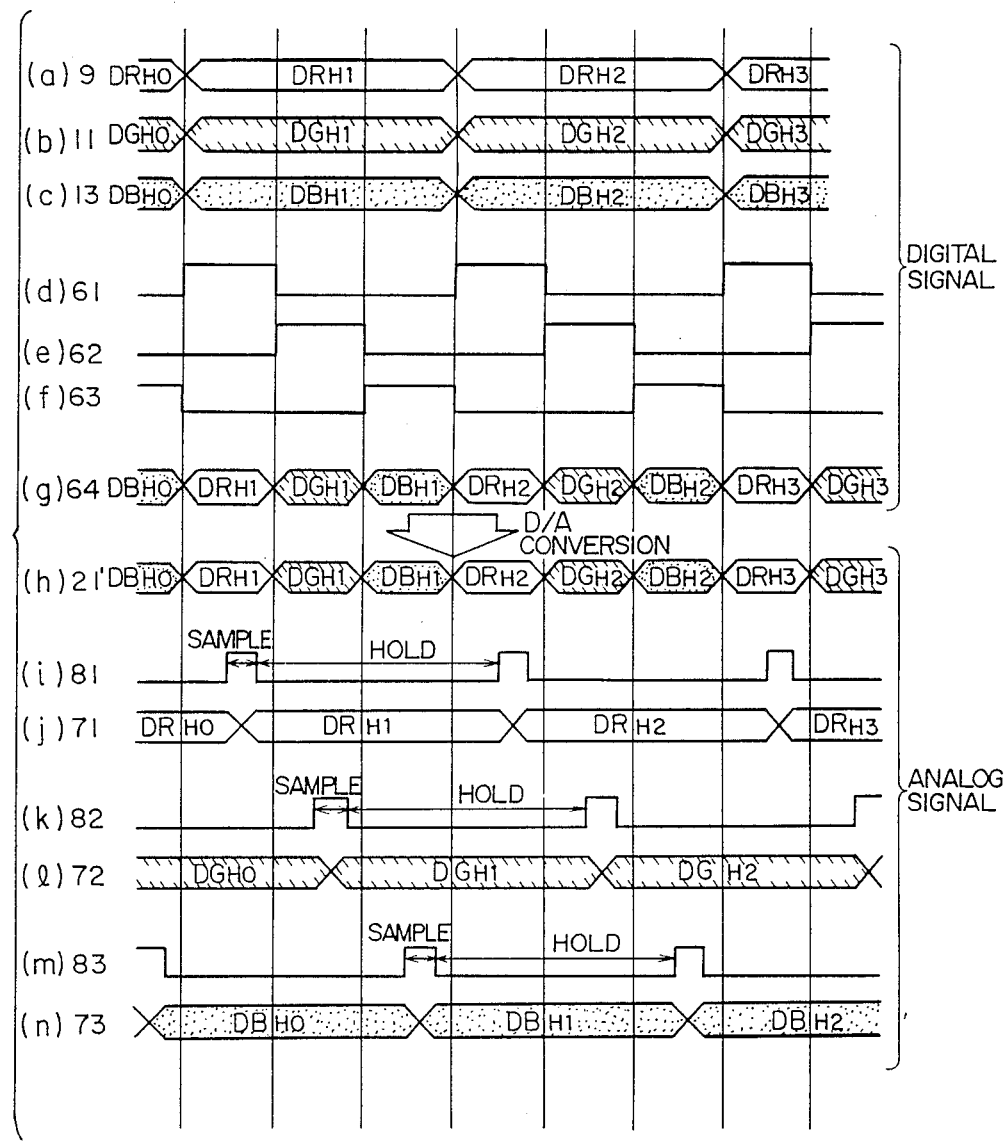
FIG. 9 is a time chart showing the timings of the main signals in the circuit of FIG. 8.

FIGS. 8 and 9 show an embodiment of a digital convergence correcting apparatus in which the horizontal and vertical CYs are provided for each of R, G, and B in the three-tube type projection television in a manner similar to the embodiment of FIGS. 1 and 2. In the second embodiment, the correction value data 9, 11, and 13 serving as the signals to drive the horizontal convergence coils 34, 36, and 38 provided in the projection tubes of R, G, and B and the correction value data 10, 12, and 14 serving as the signals to drive the vertical convergence coils 33, 35, and 37 provided in the projection tubes of R, G, and B are time sharingly multiplexed by multiplexers 15 and 15' and are converted into the analog signals by D/A converters 19 and 19'. The signals of respective channels are again extracted from the analog signals by S/H circuits 66, 66', 67, 67', 68, and 68', thereby driving the convergence coils.

That is, although two difference correction data are time sharingly multiplexed in the first embodiment, three correction data are time sharingly multiplexed into one correction data in the second embodiment.

In FIG. 9, (a), (b), and (c) denote the correction data 9, 11, and 13 as the signals to drive the horizontal convergence coils of the projection tubes Of R, G' and B and consist of the data trains of $DR_{Hi}$, $DG_{Hi}$, and $DB_{Hi}$ (i = 1, 2, ..., n) in a manner similar to the first embodiment. On the other hand, (d), (e), and (f) represent selection signals 61, 62, and 63 to drive the multiplexer 15. The selection signals 61 to 63 have the phase differences each corresponding to $\frac{1}{3}$ of the periods of the correction data 9, 11, and 13, respectively, as shown in the diagram. That is, the three correction data trains 9, 11, and 13 are time sharingly multiplexed into a multiplexed data train 64 shown in FIG. 9(g) through the multiplexer 15 which is driven by the selection signals 61 to 63. Further, the digital data train 64 is converted into an analog multiplexed signal 21' shown in FIG. 9(h) by the D/A converter 19.

The analog multiplexed signal is then converted into analog signal trains $DR_{Hi}$, $DG_{Hi}$, and $DB_{Hi}$ (i=1, 2, .., n) by the S/H circuits 66, 67, and 68 which are driven by sample and hold pulses 81, 82, and 83 having the phase differences each corresponding to $\frac{1}{3}$ of the period of the correction data train which is formed by an S/H pulse generator 25'. The analog signal trains are extracted. Even in the S/H circuit, similarly to the case of the first embodiment, the signal is sampled while avoiding the glitch which is generated by the D/A converter, so that the function to diglitch is also realized.

Figure 10:
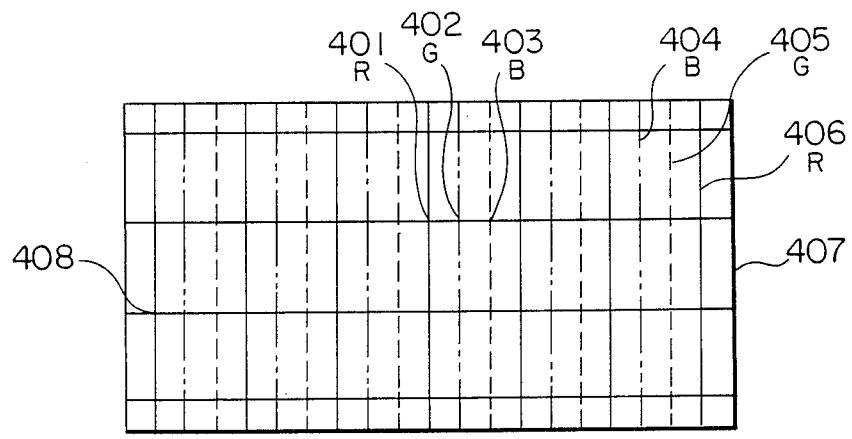
FIG. 10 is a diagram showing the phases of the cross hatch.

In the second embodiment, at the time of adjustment, phase differences also occur among the multiplexed data in a manner similar to the first embodiment. In the second embodiment, since the three data of R, G, and B are multiplexed by the correction in the horizontal and vertical direction, the phase differences each corresponding to $\frac{1}{3}$ of the interval between adjustment points exist among the adjustment points on the screen. Therefore, in such a case, in a manner similar to the first embodiment shown in FIG. 4, by deviating the phases of the cross hatches of the R, G, and B rasters by the distances each corresponding to $\frac{1}{3}$ of the interval between adjustment points, each of the rasters is corrected so as to match with a reference raster without a distortion as shown in FIG. 10. Thus, the distortions of R, G, and B and the misconvergences can be corrected.

That is, according to the second embodiment of the present invention, since every three of the data of six channels are time sharingly multiplexed, it is sufficient to use only two D/A converters.

The number of D/A converters can be further reduced. That is, data can be also time sharingly processed by using a single high-speed D/A converter on the basis of the same idea as that in FIG. 1 or 8.

FIG. 18 shows an arrangement of an optical system of a projection television receiver to which the digital correcting apparatus of the invention is applied.

A folding mirror 1008, a projection lens 1011, a CRT 1010, and a screen 1013 are used as optical parts.

Three projection lenses 1011 and three CRTs 1010 are necessary for three colors of red (hereinafter, abbreviated to R), green (hereinafter, abbreviated to G), and blue (hereinafter, abbreviated to B).

In such a projection television, there are many points to be improved with respect to the picture quality, compact size, and cost.

The respective problems will now be briefly explained hereinbelow.

(1) Picture quality:
Focusing brightness, contrast, distortion, and the like can be mentioned as significant items of the picture quality.

(2) Compact size:
It is necessary to reduce the projection distance and lens length.

(3) Cost:
It is necessary to reconsider the use of the expensive glass lens.

Figure 19:
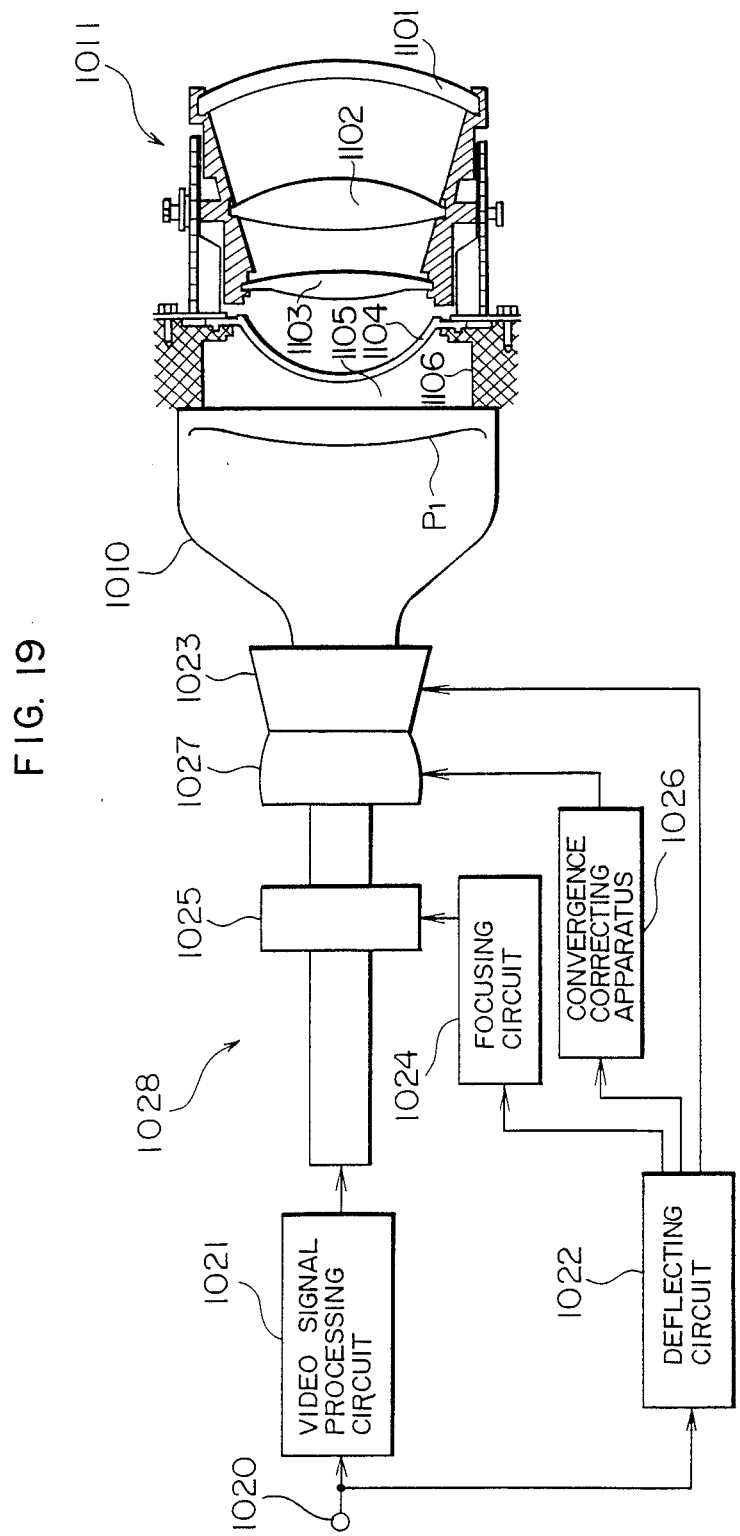
FIG. 19 is a cross sectional view showing the lens main section of an optical system for the projection television in FIG. 18.

With reference to FIG. 19, an explanation will now be made with respect to a construction of compact projection television in which aspherical plastic lenses are used, the projection distance and lens length are short, and the picture quality is improved in terms of the focusing in consideration of the above conditions (1) to (3).

In FIG. 19, the projection lens 1011 of the projection television in FIG. 18 is shown. $P_1$ denotes a CRT fluorescent screen; 106 a CRT panel; 105 a cooling liquid; 104 a fourth lens; 103 a third lens; 102 a second lens; and 101 a first lens. The optical system shown in FIG. 19 is constructed so as to obtain the optimum performance when the raster of 5.4 inches on the CRT fluorescent screen $P_1$ is enlarged to 45 inches (8.4 times) on the screen. The distance from the first lens 101 to the screen is set to 778.5 mm and the angle of view is set to 36°. The first lens 101 has an aspherical shape to eliminate the spherical aberration based on the aperture. The second lens 102 is made of a glass to reduce the focusing drift due to a temperature change and its power is set to be as large as possible.

The third lens 103 has an aspherical shape to eliminate the high-order coma and the astigmatism and its power is set to be as small as possible.

The fourth lens 104 is used to correct the image surface curve and the interface on the air side of the fourth lens has an aspherical shape to correct the sagittal aberration out of the axis.

The CRT fluorescent screen $P_1$ has a curvature to correct the image surface curve. Particularly, the screen $P_1$ has an aspherical shape to correct the high-order image surface curve.

The fundamental idea in which the optical system having the construction of FIG. 19 is used will now be described hereinbelow with respect to the following three important points.

(1) The aspherical plastic lenses are used to reduce the spherical aberration.

(2) The optical system of the short projection distance is used to reduce the chromatic aberration and to realize a compact size.

(3) The aspherical fluorescent screen is used to correct the image surface curve.

First, in the central portion, the spherical aberration and chromatic aberration can be mentioned as the aberrations which exert an influence on the lens focusing. Since the refractive surface of the lens is spherical, the spherical aberration occurs due to the reason such that the point at which the light beam near the center of the lens crosses the major axis and the point at which the light beam refracted near the periphery of the lens crosses the major axis are different. The spherical aberration can be fairly reduced by using the aspherical plastic lenses.

The chromatic aberration occurs since the refractive index depends on the wavelength and is generally reduced by combining convex and concave lenses having different dispersion. However, since a concave lens is newly necessary, the cost performance deteriorates. Therefore, the chromatic aberration is decreased by setting the projection distance to be short by also considering the compact size.

A chromatic aberration $\Delta d$ of a lens is expressed by the following equation by using a magnification M, a focal distance f, an F value, a refractive index N, and a difference $\Delta F$ between refractive indices depending on wavelengths.

$$\Delta d = \frac{(1+M)^2 f}{F \cdot M} \cdot \frac{\Delta N}{N-1} \approx \frac{(1+M)f}{F} \cdot \frac{\Delta N}{N-1}$$

It will be understood that when the F value is constant, the chromatic aberration $\Delta d$ is proportional to $(1+M)\cdot f$, that is, the projection distance. Therefore, to reduce the chromatic aberration and to improve the focus, it is effective to reduce the focal distance and to reduce the projection distance. By making the projection distance short, the compact size can be obviously realized.

The chromatic aberration of the central portion of the screen is reduced by decreasing the projection distance as mentioned above. However, since the peripheral portion increases with a decrease in projection distance, the mere reduction of the projection distance contrarily results in an increase in aberration of the whole screen.

Therefore, to correct the image surface curve, the projection tube fluorescent screen is formed as an aspherical shape. That is, an object itself which will be enlarged by the lens system is constructed so as to have a shape which has previously been corrected in the direction opposite to the direction in which the image surface curve occurs, thereby correcting the image surface curve as a whole.

FIG. 19 shows the relations among a deflecting apparatus 1028 including a digital convergence correcting apparatus 1026 of the present invention, the CRT 1010, and the projection lens 1011. Among three colors of R, G, and B, only the construction regarding the R color is shown. The constructions for G and B are similar to that for R. In the deflecting apparatus 1028, a video signal processing circuit 1021 converts a video signal input to a terminal 1020 into a voltage corresponding to a luminance change of the color. A deflecting circuit 1022 receives the video signal from the terminal 1020 and supplies a deflection signal to deflect an electron beam to a deflecting yoke 1023. A focusing circuit 1024 receives a focus signal from the deflecting circuit 1022 and supplies a focus drive signal to focus the electron beam onto the fluorescent screen PI to a focusing electromagnet 1025. The convergence correcting apparatus 1026 receives vertical and horizontal blanking signals from the deflecting circuit 1022 and supplies a convergence correction signal to a convergence yoke 1027.

The image formed on the aspherical fluorescent screen $P_1$ in the CRT 1010 is enlarged by a group of aspherical plastic lenses and formed onto the screen 1013.

In the cases of G and B, the image on the aspherical fluorescent screen $P_1$ is formed onto the screen 1013 in a manner similar to the case of R. The different image distortions are corrected and the convergence correction is executed, respectively.

As explained above, according to the invention, in a digital convergence correcting apparatus to drive the CYs of the multi-channels, by time sharingly multiplexing the digital correction data train of each channel, the D/A conversion can be executed by one or a few D/A converters. Moreover, the sampling and holding process is executed while also diglitching the output analog signal. Thus, the convergence correcting apparatus of small scale, low cost, and high performance can be realized.

Each of the foregoing embodiments has been described mainly with respect to the NTSC standard mode and IDTV mode. However, the invention can be also coped with various kinds of signals by changing the memory capacity or the free run frequency of the VCO for the PLL. That is, the invention can be also applied to the PAL system, SECAM system, EDTV (Extend Definition TV), HDTV (High Definition TV), and the like, and the displays of various types of computer terminals.

We claim:

1. A digital convergence correcting apparatus comprising:
    a digital memory for storing digital correction data corresponding to correction values at convergence adjustment points indicative of a plurality of points on at least one display screen divided in the horizontal and vertical directions;
    at least one multiplexer for reading out at least two kinds of said digital correction data from said memory and for time sharingly multiplexing said at least two kinds of digital correction data so as to produce a multiplexed signal;
    at least one digital/analog converter for receiving the multiplexed signal from said multiplexer and for digital/analog converting said multiplexed signal so as to produce an analog signal;
    at least two sample and hold circuits coupled to said at least one digital/analog converter for extracting at least two kinds of analog correction data from said analog signal output from said digital/analog converter and for sampling and holding said extracted correction data; and
    at least two convergence correcting means which are driven on the basis of the respective correction data held by said at least two sample and hold circuits for correcting said digital convergence.

2. An apparatus according to claim 1, further including pulse generating means for generating a plurality of sample and hold pulses to drive said sample and hold circuits such that said sample and hold circuits sample and hold the analog output signal while avoiding a glitch noise generated upon conversion in said digital/analog converter and included in the analog output signal thereof.

3. An apparatus according to claim 1, wherein when said display screen is adjusted in accordance with a phase difference between said analog correction data extracted by said sample and hold circuits, a phase of a cross hatch signal corresponding to the analog correction data or a phase of a marker indicative of said adjustment point is switched by phase switching means so as to be deviated by only said phase difference.

4. An apparatus according to claim 2, wherein when said display screen is adjusted in accordance with a phase difference between said analog correction data extracted by said sample and hold circuits, a phase of a cross hatch signal corresponding to the analog correction data or a phase of a marker indicative of said adjustment point is switched by phase switching means so as to be deviated by only said phase difference.

5. An apparatus according to claim 1, wherein a phase locked loop (PLL) for generating clocks of address counters to designate addresses in said digital memory includes a phase detector, a voltage controlled oscillator, and a frequency divider, the frequency divider of said PLL is constructed as an integrated circuit, and a frequency dividing ratio of the frequency divider is switched by switching means provided on the outside of said integrated circuit.

6. An apparatus according to claim 1, wherein:
said at least one multiplexer includes a plurality of multiplexers for reading digital correction data from said memory and for producing a respective plurality of multiplexed signals;
said at least one digital/analog converter includes a plurality of digital/analog converters for respectively receiving the plurality of multiplexed signals from said plurality of multiplexers and for converting said multiplexed signals so as to produce a respective plurality of analog signals; and
said at least two sample and hold circuits include at least two sample and hold circuits respectively coupled to each of said plurality of digital/analog converters for extracting the digital correction data from said plurality of analog signals.

7. A digital convergence correcting apparatus comprising:
a digital memory for storing digital correction data corresponding to correction values of convergence adjustment points indicative of plurality of points on display screens divided in the horizontal and vertical directions;
at least one multiplexer for reading out at least two kinds of said digital correction data from said digital memory and for time sharingly multiplexing;
at least one digital/analog converter for receiving the time sharingly multiplexed data from said multiplexer and for digital/analog converting;
sample and hold circuits for extracting at least two kinds of correction signals from the analog output of said digital/analog converter and for sampling and holding the extracted correction signals;
at least two kinds of convergence means which are driven in accordance with the correction data held by said sample and hold circuits; and
phase switching means for switching a phase of a cross hatch signal corresponding to said analog correction data or a phase of a marker indicative of said adjustment point so as to be deviated by only a phase difference between said analog correction data extracted by said sample and hold circuits in accordance with said phase difference when said display screens are adjusted.

8. A digital convergence correcting apparatus comprising:
a digital memory for storing digital correction data corresponding to correction values of convergence adjustment points indicative of plurality of points on display screens divided in the horizontal and vertical directions;
at least one multiplexer for reading out at least two kinds of said digital correction data from said digital memory and for time sharingly multiplexing;
at least one digital/analog converter for receiving the time sharingly multiplexed data from said multiplexer and for generating an analog signal;
sample and hold circuits for extracting at least two kinds of correction signals from the analog output of said digital/analog converter and for sampling and holding the extracted correction signals;
sample and hold pulse generating means for generating sample and hold pulses which are supplied to said sample and hold circuits, for setting phases of said sample and hold pulses so as to sample and hold the analog output signal while avoiding glitch noises which are often generated by the sample and hold circuits upon conversion of the digital/analog converter and included in the analog output signal thereof;
at least two kinds of convergence correcting means which are driven in accordance with the respective correction signals held by the sample and hold circuits to which the sample and hold pulses set by said sample and hole pulse generating means are supplied; and
phase switching means for switching a phase of a cross hatch signal corresponding to said analog correction signals or a phase of a marker indicative of said adjustment point so as to be deviated by only a phase difference between said analog correction extracted by said sample and hold circuits in accordance with said difference when said display screens are adjusted.

9. A digital convergence correcting apparatus which is used in a projection television receiver including a CRT having an aspherical fluorescent screen and a projection lens apparatus which is attached to a display screen of said CRT and has aspherical plastic lenses, comprising:
a digital memory for storing digital correction data corresponding to correction values of convergence adjustment points indicative of a plurality of points on at least one display screen divided in the horizontal and vertical directions;
at least one multiplexer for reading out at least two kinds of said digital correction data from said digital memory and for time sharingly multiplexing said at least two kinds of digital correction data so as to produce a multiplexed signal;
at least one digital/analog converter for receiving the multiplexed signal from said multiplexer and for generating an analog signal;
a plurality of sample and hold circuits coupled to said at least one digital/analog converter for extracting at least two kinds of correction signals from the analog signal of said digital/analog converter and for sampling and holding the extracted correction signals; and
at least two kinds of convergence means which are driven in accordance with the correction data held by aid sample and hold circuits for correcting said digital convergence.

10. An apparatus according to claim 9, wherein:
said at least one multiplexer includes a plurality of multiplexers for reading digital correction data from said memory and for producing a respective plurality of multiplexed signals;
said at least one digital/analog converter includes a plurality of digital/analog converters for respectively receiving the plurality of multiplex signals from said plurality of multiplexers and for converting said multiplexed signals so as to produce a respective plurality of analog signals; and
said plurality of sample and hold circuits include at least two sample and hold circuits respectively coupled to each of said plurality of digital/analog converters for extracting the digital correction data from said plurality of analog signals.

* * * * *